(12) United States Patent
Hinken

(10) Patent No.: US 9,395,172 B2
(45) Date of Patent: Jul. 19, 2016

(54) DEVICE FOR MEASURING COATING THICKNESS

(76) Inventor: Johann Hinken, Magdeburg (DE)

( * ) Notice: Subject to any disclaimer, the term of this patent is extended or adjusted under 35 U.S.C. 154(b) by 146 days.

(21) Appl. No.: 14/371,436

(22) PCT Filed: Jul. 3, 2012

(86) PCT No.: PCT/EP2012/062912
§ 371 (c)(1),
(2), (4) Date: Jul. 10, 2014

(87) PCT Pub. No.: WO2013/110356
PCT Pub. Date: Aug. 1, 2013

(65) Prior Publication Data
US 2015/0048843 A1  Feb. 19, 2015

(30) Foreign Application Priority Data

Jan. 24, 2012 (EP) ..................................... 12152238

(51) Int. Cl.
*G01B 7/06* (2006.01)
*G01B 15/02* (2006.01)

(52) U.S. Cl.
CPC . *G01B 7/06* (2013.01); *G01B 15/02* (2013.01)

(58) Field of Classification Search
CPC ........... G01B 15/02; G01B 7/06; G01N 22/00
USPC .......................................... 324/635, 636, 644
See application file for complete search history.

(56) References Cited

U.S. PATENT DOCUMENTS

| | | | |
|---|---|---|---|
| 6,496,018 B1 | 12/2002 | Nagata et al. | |
| 7,019,537 B2 * | 3/2006 | Hazel ..................... | B82Y 20/00 324/635 |
| 7,173,435 B1 | 2/2007 | Fay et al. | |
| 7,898,265 B2 | 3/2011 | Takeuchi et al. | |
| 2009/0192382 A1 * | 7/2009 | Nistler ............. | G01R 33/34046 600/410 |
| 2010/0231452 A1 * | 9/2010 | Babakhani .............. | G01S 7/032 342/368 |

OTHER PUBLICATIONS

International Search Report and Written Opinion of the corresponding PCT Application, Aug. 9, 2012.

* cited by examiner

*Primary Examiner* — Vincent Q Nguyen
(74) *Attorney, Agent, or Firm* — Kam W. Law; Squire Patton Boggs (US) LLP

(57) ABSTRACT

Provided herein is a device for measuring a thickness of a dielectric layer on a base substrate. The device is provided with a cylindrical resonant cavity having a circular cylindrical wall and a plane wall on one end thereof, wherein the opposite end is open to be placed upon the dielectric layer on the substrate to form a wall of the resonant cavity on the opposite end; an antenna located within the resonant cavity and adapted to excite an electromagnetic field in the resonant cavity that is approximately zero in the dielectric layer; a reflection meter connected to the antenna and adapted to measure the resonant frequency of the resonant cavity; and a processor connected to the reflection meter. Also provided herein is a method for measuring a thickness of a dielectric layer on a base substrate having a curved surface.

18 Claims, 5 Drawing Sheets

Fig. 3
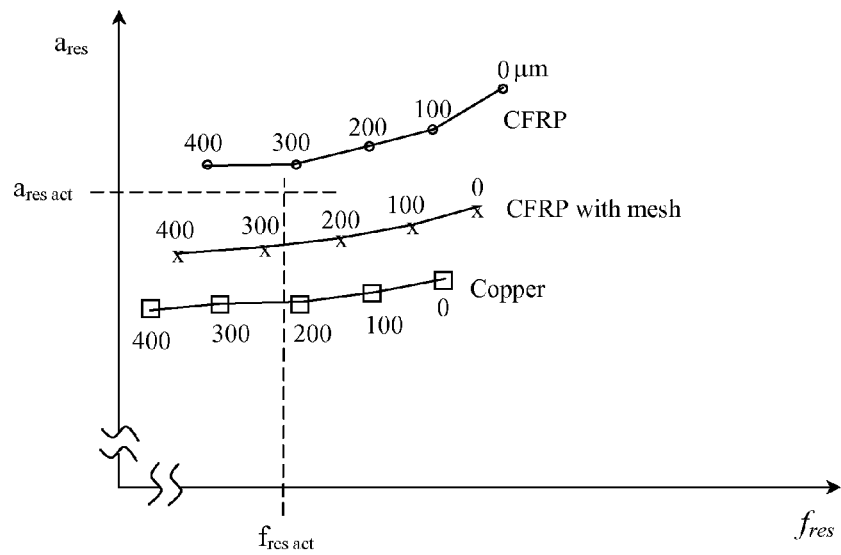
Fig. 5
Fig. 4
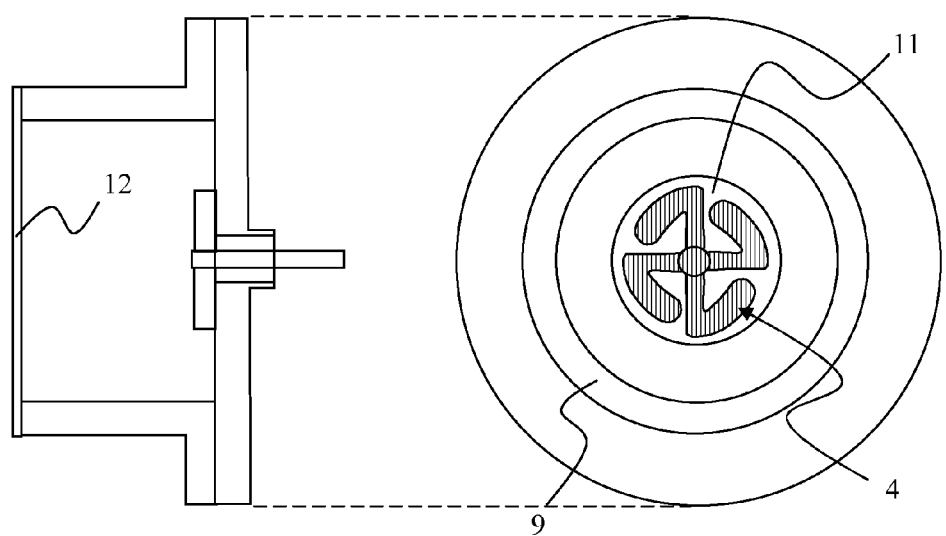

DEVICE FOR MEASURING COATING THICKNESS

CROSS-REFERENCE TO RELATED APPLICATIONS

This is a U.S. national stage application of the International Patent Application No. PCT/EP2012/062912, filed Jul. 3, 2012, which claims priority to European Patent Application No. 12152238.7, filed Jan. 24, 2012, both of which are incorporated herein by reference in their entireties.

FIELD OF THE INVENTION

The invention relates to a device for measuring thicknesses of a coating such as paint on a substrate by means of microwave radiation. In a particular embodiment the invention relates to a measurement device for measuring the thickness of a polymer coating on a substrate comprising electrically conducting composite material, with a reflection meter including a transmitter/receiver module, a processing unit, and a probe which comprises a microwave cavity.

BACKGROUND

A non-limiting example of a technical field in which the present invention can be applied is the aircraft industry. Generally, aircrafts are painted. This cover with polymer layers is used for decorative, anti-erosion, anti-corrosion, air resistance reduction and other purposes. In order not to increase the weight of the primary structure unnecessarily, the applied coating must be even and not too thick, so as not to impair the hardening process and to avoid the formation of wrinkles, bubbles and/or droplets, and the occurrence of other coating defects. It must not be too thin, if the desired functional and/or visual effects are to be achieved, for example having a minimal opaqueness. Therefore, the thicknesses have to be monitored within close tolerances using measurement equipment, during production and also during maintenance procedures. Typical common thicknesses are in the range of 0.05 mm to 0.5 mm.

Known from the prior art are purely mechanically acting coating thickness measurement schemes and units, with which the determination of the material thickness of the applied polymer coating takes place, for example, by means of the measurement of the penetration path of a measurement body. Such coating thickness measurement units do on the one hand not allow a non-destructive measurement and on the other hand the measurement accuracy that can be achieved is inherently limited in principle, in particular in the case of low material thicknesses of polymer coatings.

Furthermore coating thickness measurement units are known in which the measurement of the material thickness of a polymer coating takes place through eddy current measurements with the introduction of electric coils. While measurement units of this type do allow a non-destructive measurement with a sufficiently high accuracy—after calibration has taken place—they have the disadvantage that the substrate with the polymer coating must feature a substantially high electrical conductivity. Accordingly these units are only suitable for the measurement of the material thickness of a polymer coating on a substrate formed from a composite material to a very limited extent. Such composite material as a rule has only a medium electrical conductivity, as for example in the case of a carbon fibre reinforced epoxy resin. In addition to the medium conductivity this material is anisotropic due to the distinct direction of fibres and rovings.

The limitation of the thickness measurement based on eddy currents to good conductors is caused by the skin depth which should be considerably smaller than the dielectric layer thickness. This does not hold for the medium electrically conducting carbon fibre reinforced plastic, even at the highest normally used eddy current frequencies of about 5 MHz. The skin depth in the substrate becomes too high. It can be reduced when operating at considerably higher frequencies, namely at microwave frequencies. Therefore there were several attempts for microwave based thickness measurements in the past.

From the German utility model DE 1 792 402 a device for the non-destructive measurement of a coating thickness of a medium on a base material is known, in which the measurement is based on the evaluation of the phase displacement that ensues with the passage of microwaves through the medium and their subsequent reflection at the base material. However, this coating thickness measurement unit of prior art only allows a measurement of the thickness of a coating located on a purely metallic base material. The proposal according to DE 1 792 402 is a rather bulky setup and the raw data depend on the dielectric constant of the measured coating. This system cannot be used for the intended applications.

The above mentioned phase displacement per unit coating thickness can be increased by using a coaxial reflection probe together with special circuit improvements, as known from document US 2011/0062965 A1. The coaxial probe described in US 2011/0062965 A1 generates a circular symmetric field and is therefore well suited to measure anisotropic substrates, i.e. no turning of the probe into a certain angle with respect to the carbon fibre direction is necessary. However, the probe produces an electric microwave field within the paint and therefore the thickness data are depending on the dielectric constant of the dielectric layer. Furthermore the momentarily irradiated area of dielectric layer in the substrate is rather small so that the result can vary over the surface when the substrate is too inhomogeneous. This can especially be the case on substrates with metallic mesh for lightning protection.

In patents U.S. Pat. No. 6,184,694 B1 and U.S. Pat. No. 6,297,648 B1 the use of reference cavities and frequency counters are proposed. The U.S. Pat. No. 7,173,435 B1 generally describes a device that is proposed to use two antennas with separate transmitter and receiver. The disclosures of U.S. Pat. No. 6,184,694 B1, U.S. Pat. No. 6,297,648 B1 and U.S. Pat. No. 7,173,435 do not describe the essential part in detail, i.e. the cavity, but only the surrounding circuitry. They use two antennas with reference cavities, frequency counters and/or separate transmitters and receivers. This makes the systems rather bulky.

In the U.S. Pat. No. 7,898,265 B2 a cavity resonator is used measuring in the transmission method with separate transmitter and receiver and with separate antennas. The use of the TM011 mode in a circular cylindrical cavity resonator is proposed. However, also here a transmission method is used with two antennas and separate transmitter and receiver which make the system rather bulky. The proposed TM011 mode has a circular cylindrical electromagnetic field and therefore it is not necessary to adjust a probe according to fibre direction.

However, the TM011 mode has significant microwave wall currents in axial direction which also flow in the undisturbed cavity from the tube segment to the end plates. As one of the end plates is constituted by the sample consisting of a substrate of medium conductivity with or without an isolating dielectric layer these currents are heavily disturbed. This causes significant contact problems when placing the microwave cavity on the device to be tested. Extremely small changes in the alignment will produce significant changes in the displayed data. The proposed groove choke will solve this problem only partially and will increase the size of the probe.

Furthermore the TM011 mode has a non-zero electric field which is perpendicular to the substrate plane and thus penetrates the dielectric layer to be measured. Therefore the data which are generated by the system depend on the dielectric constant of the paint. Furthermore it should be noted that without special precautions the useable bandwidth of the system will be limited by the excitation of parasitic modes other than the TM011. This limitation will cause a rather limited span of measurable dielectric layer thicknesses.

Therefore, there is a need for methods and handy devices that are capable of non destructive measurement of a thin film thickness over substrate material which has a medium electrical conductivity and may be anisotropic, such as for use in the production and maintenance of air plane parts made of carbon fibre reinforced plastic with and without metallic mesh for lightning protection. Furthermore, generally the dielectric constant of the film is not known and sometimes also the substrate material and its conductivity are not exactly known to the inspector. Thus there is a need for methods and devices that do not heavily depend on these possibly unknown parameters.

SUMMARY OF THE INVENTION

According to an aspect of the invention a device for measuring a thickness of a dielectric layer on a base substrate is provided, comprising:
- a cylindrical resonant cavity having a circular cylindrical wall and a plan wall on one end thereof, wherein the opposite end is open to be placed upon the dielectric layer on the substrate to form a wall of the resonant cavity on the opposite end;
- an antenna located within said resonant cavity and adapted to excite an electromagnetic field in the resonant cavity that is approximately zero in the dielectric layer;
- a reflection meter connected to said antenna and adapted to measure the resonant frequency of the resonant cavity; and
- a processor connected to said reflection meter and adapted to determine the thickness of the dielectric layer from the resonant frequency of the resonant cavity.

The objects of the invention are met by use of a circular cylindrical resonance cavity operated in a mode having an approximately zero electromagnetic field in the dielectric layer. The coated part to be measured, consisting of the substrate and the dielectric layer, is used as one end plate of the resonator. Thickness variations of the dielectric layer will cause shifts in the resonance frequency of the resonator. This resonance frequency is detected using only one antenna. The measurement is performed by a reflection meter which is controlled by a processor.

According to an embodiment the electromagnetic field in the resonant cavity has substantially a TE01n mode, wherein n is an integer.

The field of such a TE01n mode in a circular cylindrical cavity is independent of the circular coordinate. Therefore no alignment according to distinct directions of anisotropic substrates is necessary. Furthermore this mode has no currents in the circular cylindrical wall or tube segment, respectively, flowing in axial direction. Therefore no contact problems between cavity and measurement device will occur.

Furthermore the TE01n modes have no electric field in axial direction, according to its denomination "transverse electric: TE", and the transverse electric field at the end plate is zero in the case of an ideal conductor. It will be approximately zero in case of a medium conductor such as carbon fibre reinforced plastic. Therefore the total electric field in the dielectric layer is approximately zero and cannot influence the displacement currents in the dielectric layer. Therefore the resonance frequency deviations are almost free of parasitic dependencies of the dielectric constant of the dielectric layer. Thus also the dielectric layer thickness will be approximately independent of this dielectric constant.

According to an embodiment the resonant cavity has a port opening for connecting said antenna to said reflection meter through said port opening.

According to an embodiment the reflection meter is adapted to measure the resonant frequency of the resonant cavity by measuring the relative input reflection coefficient and the input impedance, respectively, at said port. These two complex parameters can be measured both in arbitrary units.

When measuring the reflection coefficient instead of the transmission coefficient only one antenna instead of two are needed. This reduces the size of the cavity with its ports. Also it allows using small frequency modulated continuous wave, FMCW, radar modules as the microwave measurement system instead of separate transmitters and receivers. Such modules are readily available on the market and may contribute to a handy size of the device.

According to an embodiment the reflection meter comprises a frequency modulated continues wave, FMCW, radar module.

According to an embodiment the antenna is adapted for suppressing parasitic modes. In a preferred embodiment this can be achieved by an antenna which consists of conductive circular segments in a plane perpendicular to the axis of said cylindrical resonant cavity.

According to an embodiment the frequency range of the excited electromagnetic field is in the microwave range. In a preferred embodiment the frequency is approximately 24 GHz.

According to an embodiment the processor is further adapted to determine the thickness of the dielectric layer by also evaluating the amplitude of the reflection coefficient at the resonant frequency. This may be useful because the resonant frequency at the same thickness of the dielectric layer depends to a small extend also on the substrate conductivity, which in turn largely influences the amplitude of the reflection coefficient. Therefore, also considering the amplitude may give higher precision in determining the thickness of the dielectric layer.

According to an embodiment the device further comprises a memory storing one or more calibration curves for different substrate materials and a two-dimensional interpolation for the evaluation of measurement data. This may be useful if the different substrate materials have different electrical conductivity.

According to an embodiment the processor is further adapted to determine the conductivity of the substrate material.

According to an embodiment the device further comprises a display adapted for displaying the determined thickness. This embodiment inter alia allows integrating all components of the measuring device within a single housing, with no external connections required (in case of a battery power supply).

According to an embodiment the reflection meter is adapted to output the magnitude of the input reflection coefficient to the processor.

According to an embodiment the reflection meter is adapted to output the real part and/or the imaginary part of the input reflection coefficient to the processor.

According to an embodiment the device further comprises a dielectric plate closing the opposite end of said resonant cavity, to be placed upon the dielectric layer on the substrate. This embodiment can be used to prevent wear on the dielectric layer of the part to be tested, as well as preventing the inside of the resonant cavity from corrosion and contamination by dust, dirt, fluids etc. Preferably the dielectric plate is smooth, relatively soft, and exhibits low friction in order to prevent scratches and the like on the surface of the part to be tested.

According to an embodiment the device is adapted to detect whether the device is placed upon the dielectric layer on the substrate, and adapted to stop the excitation of the electromagnetic field in the resonant cavity or change the frequency of the electromagnetic field in the resonant cavity to a park frequency while the device is not placed upon the dielectric layer on the substrate.

This embodiment is particularly advantageous for situations when the—for example hand-held—device is not placed on the part to be tested. In these situations the device can act like an antenna and thus produce unwanted external radiation. Thus in this embodiment the microwave power which is generated in the reflection meter can be switched off or the frequency can be adjusted to a "park" frequency within a frequency region where such interference radiation is allowed, e.g. to an ISM-band.

According to an embodiment the device further comprises a collar of absorbing material located around the outer side of the cavity wall, arranged to touch the dielectric layer during use of the device, in order to suppress or prevent interference radiation from being emitted. In this embodiment it can be prevented that interference radiation is emitted from the device while in use, or at least such interference radiation is suppressed to a large extent. In order to achieve this, the absorbing material can be chosen according to the frequencies used, i.e. to have maximal absorption for frequencies used, in order to maximize the absorption effect.

BRIEF DESCRIPTION OF THE DRAWINGS

In the drawings

FIG. 3 shows the calibration matrix and actually measured values for resonant frequency and amplitude of the dip during the measurement; and FIG. 4 shows a cross section of the cavity as seen facing the antenna from the open end;

FIG. 5 shows a further embodiment of the present invention;

DETAILED DESCRIPTION OF THE INVENTION

It should be noted that the following description uses particular examples and use cases to show possible embodiments of the invention. However, it is to be understood that the invention is not limited thereby. Instead the invention can be applied to all situations in which the thicknesses of dielectric layers on a base substrate shall be measured, not only in the aircraft or automotive industry.

Figure 1:
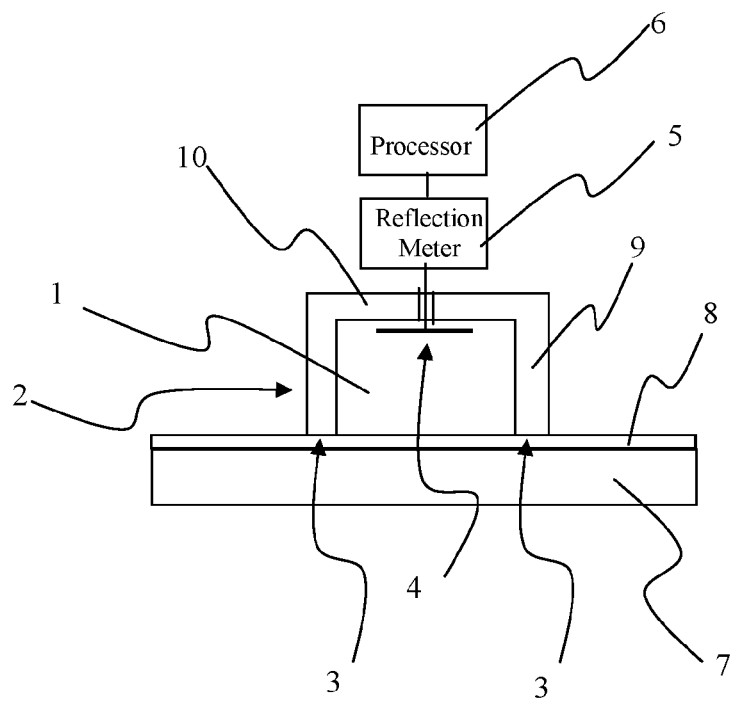
FIG. 1 is a schematic view of a microwave paint thickness sensor in accordance with the present invention.

An embodiment in accordance with the present disclosure is shown in FIG. 1. It comprises a circular cylindrical resonant cavity 1 with a chamber 2. The chamber 2 is formed by a circular cylindrical side wall 9 and a plane wall 10 on the upper side thereof. On the other side of the cylindrical side wall 9 an open flat end 3 is located. At the open end 3 of the resonator the part to be tested is placed, consisting of the substrate 7 coated with the dielectric layer 8. As a result, the part to be tested forms a wall of the resonant cavity 1, opposite the plane wall 10.

An antenna 4 is located on the plane wall 10 inside the resonant cavity 1, wherein the plane wall 10 comprises a port opening to connect the antenna 4 to a reflection meter 5 that is located outside the resonance cavity. The reflection meter 5 is controlled by a processor 6. According to an embodiment the electromagnetic field excited by the antenna 4 in the resonant cavity 1 is preferably being operated in the TE012 mode.

In a preferred embodiment the reflection meter 5 is realized by an FMCW radar module operating at 24 GHz. The processor 6 can be a processor integrated in the measuring device, but in alternative embodiments the processor 6 can also be realized by external processing equipment such as stationary or portable computers. In such cases a connection such as via Universal Serial Bus, USB, can be used to connect the reflection meter 5 with the processing equipment. In one preferred embodiment the processor is therefore realized by a netbook computer.

Figure 2:
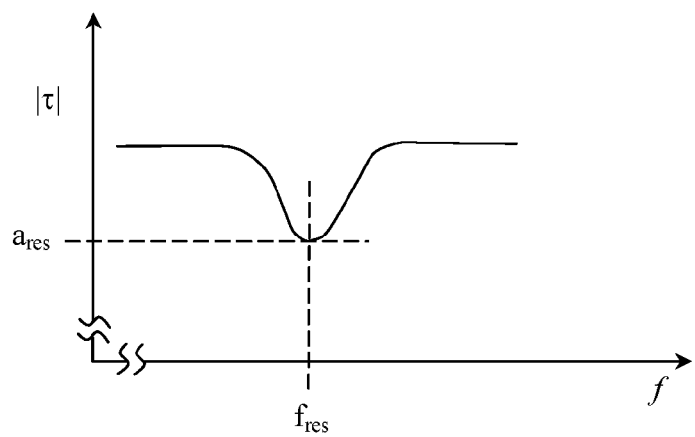
FIG. 2 shows the response measured by the reflection meter, wherein the amplitude of the reflection coefficient is shown versus the frequency.

As controlled by the netbook 6 the FMCW radar module sweeps the frequency through a predetermined frequency band in several steps. A typical response, i.e. amplitude of the reflection coefficient versus frequency, is shown in FIG. 2.

The resonant frequency $f_{res}$ and the depths of the dips $a_{res}$ are indicated and stored in the netbook 6. In this case an FMCW radar module is used with a digital output which can be connected to the netbook by a USB interconnection. The processor uses the values $f_{res}$ and $a_{res}$ for interpolation in a calibration matrix and evaluates the film thickness. The result of the thickness evaluation is then displayed on the screen.

The calibration of the device can be realized by taking the substrate of the type that will be tested in practice, and placing plastic foils of known thickness on it. In this way for example the upper line in FIG. 3 is generated. In FIG. 3 three respective lines are shown for three substrate materials CFRP (the actually measured values indicated by small circles), CRFP with metallic mesh (indicated by x), and copper (indicated by small squares), together with measured values of thicknesses of the dielectric layer of 0, 100, 200, 300 and 400 µm.

When measuring an unknown thickness the actual resonant frequency $f_{res\_act}$ is determined and the interpolation in the line of the corresponding substrate material gives the actual film thickness. That is, in the example depicted in FIG. 3, for a measurement with a base substrate "CFRP with mesh" one would derive a thickness of about 280 µm, whereas for a measurement with a base substrate "CFRP" one would derive a thickness of about 315 µm.

Another embodiment of the present invention considers the situation that the substrate and especially its conductivity are not exactly known to the testing personal. In an extreme case it may be metal or Carbon Fibre Reinforced Plastic (CFRP), or CFRP with a metal type lightning protection. But also different types of CFRP may have different conductivities and may yield slightly different resonant frequencies. Therefore not only one calibration curve but a multiple of calibration curves are generated.

FIG. 3 shows three such calibration curves for substrates from copper, CFRP, and CFRP with copper mesh. During the measurement the actual values $f_{res\ act}$ and $a_{res\ act}$ are determined like described above and from interpolation in the matrix of FIG. 3 the thickness of a layer is determined. Furthermore the value of $a_{res\ act}$ gives a hint to the conductivity of the substrate and thus to the type of material. That is, in the example depicted in FIG. 3 one could derive that the substrate is more likely to be "CFRP" than "CFRP with mesh", as the value $a_{res\ act}$ is a bit closer (on the $a_{res}$ axis) to the line belonging to CFRP than CFRP with mesh.

In a further embodiment of the present invention special precautions are taken for the thickness span that can be measured. Without these precautions all kinds of TE and TM modes can be excited in the cavity. The used mode TE012 and all parasitic modes contribute to the measured reflection coefficient. The more parasitic modes are excited the smaller is the frequency span in which the TE012 mode can uniquely be used.

In order to increase this frequency span and thus the span of the dielectric film thickness which can be measured, parasitic modes have to be suppressed. This can be achieved by using a proper antenna adapted for suppressing such parasitic modes.

FIG. 4 shows the layout of such an antenna 4. The antenna 4 is planar and printed on a dielectric substrate 11. FIG. 4 shows a view of the interior of the chamber 2, as seen when facing the antenna 4 from the open end of the device. This type of antenna only excites TE0mn modes, m, n being integers, and so reduces the number of parasitic modes considerably.

The above described embodiments consist of two modules, a hand-held module containing the cavity resonator 1 and the FMCW radar module 5, as well as the control and display module comprising the processor 6, which can e.g. be realized by a portable computer or netbook. The interconnection between both modules can be achieved by wire or alternatively wireless, e.g. with a Bluetooth link, infra-red link or other short-range connection. Another embodiment of the system is an integration of the display and control module 6 into the hand-held module. The measured film thickness can directly be displayed on the integrated hand-held module.

In principal, the electromagnetic fields from inside the cavity can propagate through the dielectric layer 8 between cavity wall 1 and substrate 7 and radiate into the surrounding, so producing interference radiation. For the preferred TE01n modes this radiation is nearly zero. However, in situations when the hand-held module is not placed on the part to be tested but somewhere in the air it acts like an antenna.

In a further embodiment of the systems in these cases the microwave power which is generated in the reflection meter 5 can be switched off or the frequency can be adjusted to some "park" frequency within a frequency region where such interference radiation is allowed, e.g. in an ISM-band. In a simple embodiment a pressure/touch or proximity sensor located in the open end 3 of the device can be used to detect if the device is placed on a surface to be tested or not. In another embodiment this situation is derived from continuously measuring the frequency and the amplitude values and detecting that these are being "out of range", i.e. showing a variation that is unlikely to be caused during normal usage situations.

In order to avoid that interference radiation is emitted while in use, a collar of absorbing material can be arranged on the outer side at least on the side of the device to be put in contact with the test surface, so that during use the collar will be in sealing contact with the surface to be tested. Thereby the emission of interference radiation to the outside can be suppressed or even completely avoided.

In a further embodiment in addition to the one shown in FIG. 1 in FIG. 5 at the bottom of the cavity 1 a thin dielectric plate 12 is fixed at the otherwise open end 3 of the cavity 1. This is to prevent wear on the dielectric layer 8 of the part to be tested. Therefore the dielectric plate can be made from a smooth, soft material showing low friction.

Figure 6:
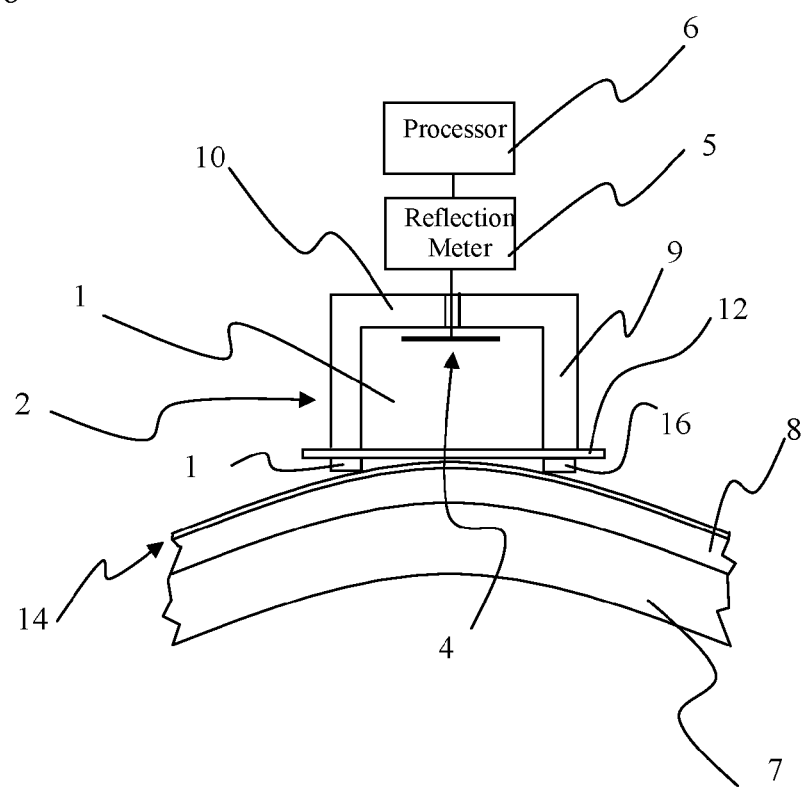
FIG. 6 shows how the invention can be applied to curved surfaces.

The previous has assumed that the surface of the area to be measured is substantially flat, at least area-wise in the area to be measured. However, the invention can also be applied to curved surfaces as they are often found in e.g. aircraft or automobile parts. This situation is shown in FIG. 6. The measurement device 2 can be the same as in any previously described embodiment, although in this specific example the particular embodiment as of FIG. 5 is illustrated, in which the resonant cavity 1 is closed off by a thin dielectric plate 12.

In the situation depicted in FIG. 6 the base substrate 7 has a curved surface. Placing the thin dielectric plate 12 onto the convex or concave surface to be measured involves the presence of an additional average distance between the bottom of the thin dielectric plate 12 and the surface of the layer 8, i.e. of the part to be measured, causing an offset. Thus a precise direct measurement of the thickness of layer 8 is not possible, as the influence of the curvature may not be known. The invention compensates for this by a two-phase measurement.

In the first phase (step 102 in FIG. 7) a thin conductive, e.g. metal foil 14 is placed onto the curved surface area to be measured. This must be accomplished so that the foil 14 closely fits to the curved surface area. Preferably there is a substantially zero distance between the foil 14 and the surface area to be measured, i.e. without air contraptions, wrinkles and the like, so that the foil 14 closely follows the curved surface.

After this preparation a first thickness measurement is performed (step 104 in FIG. 7), using the measurement device 2 of an embodiment of the invention. With this measurement thickness compensation data are derived. As there is no dielectric layer present above the metal foil 14 the resulting thickness should be measured as zero if the surface were non-curved and perfectly straight. However, due to the curvature of the surface area to be measured this is not necessarily so. Instead, the "virtual thickness" that is obtained in this first measurement phase indicates the thickness offset for the curved surface in question and thus allows to derive corresponding compensation data.

Figure 7:
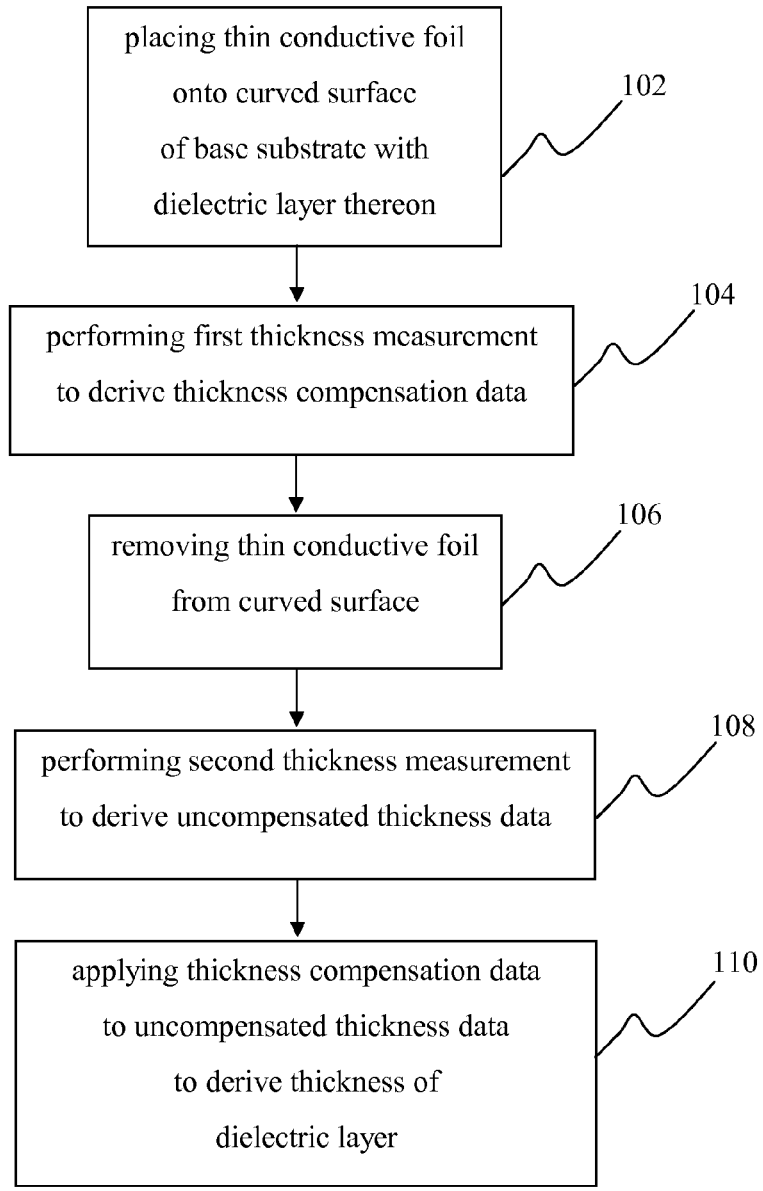
FIG. 7 is a flow diagram of a method according to an embodiment of the invention.
Figure 8:
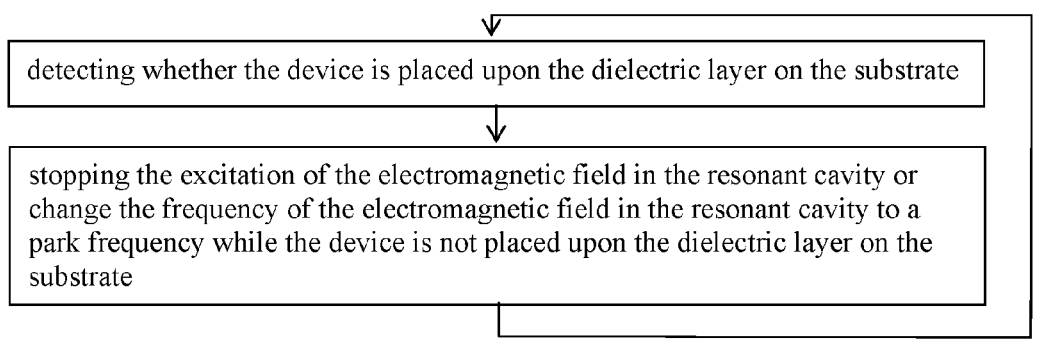
FIG. 8 is a flow diagram showing the invention of claim 16.

To prepare for the next phase the conductive foil is removed (step 106 in FIG. 7). A second thickness measurement is then performed (step 108 in FIG. 7), with the device 2 being in exactly the same position relative to the curved surface as for the initial measurement. Uncompensated or rough thickness data can be derived from this measurement step.

In order to determine the actual thickness of the dielectric layer 8, the previously derived compensation data are applied (step 110 in FIG. 7) to the uncompensated thickness data, in order to yield the real thickness of the dielectric layer 8.

It is important that in the two phases of the measurement the relative position of the measurement device 2 is as accurately fixed as possible, which is apparently more difficult with curved surfaces compared to perfectly flat surfaces. In an embodiment of the invention shown in FIG. 6 this can be accomplished by using adapted positioning elements, e.g. in form of lifting stripes 16 that are positioned at the edge of the device to ensure the correct height above the surface.

It is preferred to use a measurement device 2 with closed cavity (as shown in FIGS. 5 and 6) for measuring curved surfaces. However, it is also possible to use a device with open cavity, as long as the exact relative positioning of the device in the measurement phases can be ensured.

The invention claimed is:

1. A device for measuring a thickness of a dielectric layer on a base substrate, comprising:
    a cylindrical resonant cavity having a circular cylindrical wall and a plane wall on one end thereof, wherein the opposite end is open to be placed upon the dielectric layer on the substrate to form a wall of the resonant cavity on the opposite end;
    an antenna located within said resonant cavity and adapted to excite an electromagnetic field in the resonant cavity that is approximately zero in the dielectric layer
    a reflection meter connected to said antenna and adapted to measure the resonant frequency of the resonant cavity; and
    a processor connected to said reflection meter and adapted to determine the thickness of the dielectric layer from the resonant frequency of the resonant cavity,
    wherein said electromagnetic field in the resonant cavity has substantially a TE01n mode, wherein n is an integer.

2. The device according to claim 1, wherein said resonant cavity has a port opening for connecting said antenna to said reflection meter through said port opening.

3. The device according to claim 2, wherein said reflection meter is adapted to measure the resonant frequency of the resonant cavity by measuring the relative input reflection coefficient and the input impedance, respectively, at said port.

4. The device according to claim 3, wherein the reflection meter is adapted to output the magnitude of the input reflection coefficient to the processor.

5. The device according to claim 4, wherein the reflection meter is adapted to output the real part and/or the imaginary part of the input reflection coefficient to the processor.

6. The device according to claim 1, wherein the reflection meter comprises a frequency modulated continues wave, FMCW, radar module.

7. The device according to claim 1, wherein said antenna is adapted for suppressing parasitic modes.

8. The device according to claim 7, wherein said antenna consists of conductive circular segments in a plane perpendicular to the axis of said cylindrical resonant cavity.

9. The device according to claim 1, wherein the frequency range of the excited electromagnetic field is in the microwave range.

10. The device according to claim 1, wherein said processor is further adapted to determine the thickness of the dielectric layer by also evaluating the amplitude of the reflection coefficient at the resonant frequency.

11. The device according to claim 1, further comprising a memory storing one or more calibration curves for different substrate materials and a two-dimensional interpolation for the evaluation of measurement data.

12. The device according to claim 1, wherein said processor is further adapted to determine the conductivity of the substrate material.

13. The device according to claim 1, further comprising a display adapted for displaying the determined thickness.

14. The device according to claim 1, further comprising a dielectric plate closing the opposite end of said resonant cavity, to be placed upon the dielectric layer on the substrate.

15. The device according to claim 1, adapted to detect whether the device is placed upon the dielectric layer on the substrate, and adapted to stop the excitation of the electromagnetic field in the resonant cavity or to change the frequency of the electromagnetic field in the resonant cavity to a park frequency while the device is not placed upon the dielectric layer on the substrate.

16. The device according to claim 1, further comprising a collar of absorbing material located around the outer side of the cavity wall, arranged to touch the dielectric layer during use of the device, in order to suppress or prevent interference radiation from being emitted.

17. A method for measuring a thickness of a dielectric layer on a base substrate having a curved surface, the method comprising:
    placing a thin conductive foil onto the curved surface to closely fit the curved surface, at least in an area to be measured;
    performing, using the device according to claim 1, a first thickness measurement in the area to be measured to derive thickness compensation data;
    removing the thin conductive foil;
    performing, using said device, a second measurement in the area to be measured to derive uncompensated thickness data; and
    applying said thickness compensation data to said uncompensated thickness data to derive the thickness of said dielectric layer.

18. The method according to claim 17, wherein the device is respectively positioned on the area to be measured using positioning elements adapted for ensuring the correct positioning of the device in relation to the surface area to be measured.

* * * * *